(12) United States Patent
Shi

(10) Patent No.: US 12,083,628 B2
(45) Date of Patent: Sep. 10, 2024

(54) CABLE-TYPE WELDING WIRE

(71) Applicant: JIANGSU YINLI WELDING ENGINEERING TECHNOLOGY RESEARCH CO., LTD., Nanjing (CN)

(72) Inventor: Zhen Shi, Nanjing (CN)

(73) Assignee: JIANGSU YINLI WELDING ENGINEERING TECHNOLOGY RESEARCH CO., LTD., Nanjing (CN)

( * ) Notice: Subject to any disclaimer, the term of this patent is extended or adjusted under 35 U.S.C. 154(b) by 892 days.

(21) Appl. No.: 17/255,736

(22) PCT Filed: Jun. 25, 2019

(86) PCT No.: PCT/CN2019/092673
§ 371 (c)(1),
(2) Date: Dec. 23, 2020

(87) PCT Pub. No.: WO2020/001418
PCT Pub. Date: Jan. 2, 2020

(65) Prior Publication Data
US 2021/0276135 A1    Sep. 9, 2021

(30) Foreign Application Priority Data

Jun. 25, 2018  (CN) .......................... 201810664973.3

(51) Int. Cl.
*B23K 35/02*     (2006.01)
(52) U.S. Cl.
CPC ...... *B23K 35/0283* (2013.01); *B23K 35/0266* (2013.01)

(58) Field of Classification Search
CPC ............ B23K 35/0283; B23K 35/0266; B23K 35/02; B23K 35/40
See application file for complete search history.

(56) References Cited

U.S. PATENT DOCUMENTS 2,964,612 A * 12/1960 Savard ............... B23K 35/0283
219/137 WM
2018/0056450 A1* 3/2018 Shu ..................... B23K 35/0261

OTHER PUBLICATIONS

DSW. (Sep. 24, 2012). Re: Millermatic 211 and wire size vs metal size. [Online forum post]. WeldingWeb.com. (Year: 2012).*
(Continued)

*Primary Examiner* — Brian W Jennison
*Assistant Examiner* — Kristina J Babinski
(74) *Attorney, Agent, or Firm* — E. Eric Mills; Nicholas P. Stadnyk; Maynard Nexsen PC

(57) ABSTRACT

A cable-type welding wire provided in the present application, includes a central welding wire and n peripheral welding wires arranged so as to be spirally wound on the central welding wire, with each of the peripheral welding wires having a diameter of $d_{peripheral}$, and adjacent peripheral welding wires being arranged to be tangential to each other, wherein, the peripheral welding wires have a lay length of T, which satisfies the equation of $T=m\times(d_{peripheral}+d_{central})/2$, where m is a multiple of the lay length, $d_{peripheral}$ is a diameter of the peripheral welding wire, $d_{central}$ is a diameter of the central welding wire, and $3.2\leq m<20$. This application can obtain a smaller penetration depth when the welding parameters remain constant due to a small multiple of the lay length of the cable-type welding wire, and can further reduce welding arcing current.

11 Claims, 5 Drawing Sheets

(56) References Cited

OTHER PUBLICATIONS

China National Intellectual Property Administration, International Search Report of PCT/CN2019/092673, Aug. 12, 2019.
China National Intellectual Property Administration, Written Opinion of PCT/CN2019/092673, Aug. 30, 2019.
Yang, Zhidong, et al., Effect of forces on dynamic metal transfer behavior of cable-type welding wire gas metal arc welding, The International Journal of Advanced Manufacturing Technology, Mar. 27, 2018, 81-90, 97, Springer-Verlag London Ltd.

* cited by examiner

CABLE-TYPE WELDING WIRE

CROSS REFERENCE TO RELATED APPLICATIONS

This application is a 35 U.S.C. § 371 U.S. national phase entry of International Application No. PCT/CN2019/092673 having an international filing date of Jun. 25, 2019, which claims the benefit of Chinese Application No. 201810664973.3 filed Jun. 25, 2018, the contents of each of which are incorporated herein by reference in their entireties.

TECHNICAL FIELD

The present application relates to the field of welding wire technology, and specifically relates to a cable-type welding wire.

BACKGROUND

The cable-type welding wire (also known as a multi-stranded welding wire) is composed of a central welding wire and multiple peripheral welding wires with the same diameter wound around the central welding wire at a helix angle α and tangent to each other. The cable-type welding wire has the advantages of good coilability, the right diameter during wire feeding, a great penetration depth and fusion width during welding, and high deposition efficiency, on the grounds that: (1) during welding of the cable-type welding wire (such as $CO_2$ metal inert gas welding), a small anode region thereof follows the feeding thereof and rotates around an anode region thereof, and quickly merges into a bundle-shaped rotating arc column area, the beam-shaped rotating welding arc is beneficial to the melting and the droplet transfer of the welding wire, as well as uniform distribution in a molten pool, thereby reducing weld defect and improving welding quality; (2) the cable-type welding wire has a vortex-type fluid flow pattern, causing the presence of vortex-type flow of the liquid metal in the molten pool during the welding process. The vortex motion of the liquid metal leads to depression in the middle of the molten pool, driving the high-temperature liquid metal to flow to the bottom of the molten pool, which is beneficial to increase the penetration depth.

Existing surfacing methods include hot wire TIG surfacing, manual electrode arc welding surfacing, stripe electrode surfacing, plasma surfacing, laser surfacing, explosive welding, etc., wherein, for welding with strict requirements on application conditions and a smaller thickness of the surfacing layer, such as 3-5 mm, what is usually adopted is hot wire TIG surfacing, plasma surfacing, laser surfacing, manual electrode arc welding surfacing; for welding requiring the thickness of the surfacing layer to be more than 8 mm, what is usually adopted is submerged arc surfacing and consumable electrode metal inert gas surfacing. A single hot wire TIG surfacing torch has a deposition efficiency of merely about 0.8 kg per hour, which is quite low, but with a small penetration depth, can reach into pipes, inner cavities of equipment, and can achieve all-position automatic surfacing, and is thus mainly applied in conditions with strict requirements, such as hydrogenation equipment, subsea oil pipelines, wellheads, Christmas trees, valves, etc. Manual electrode arc welding, which is flexible in operation but limited by the welder's influence himself and blind spots of sight, arm operation blind spots, etc., is usually used in conditions that are easy to handle and less demanding, such as on the outer surfaces of small components. Strip electrode surfacing has the advantages of high efficiency and slightly shallow penetration, but it is difficult to achieve welding for special-shaped parts such as valves and elbows, and the welding position is limited to flat welding, and it cannot be achieved for small channel welding, and is often used in surfacing of the barrel of pressure vessels and pipes with a large diameter, etc. Laser and plasma reactor powder metallurgy surfacing has the advantages of high energy, high efficiency, and shallow penetration, but it is limited by the high price of the equipment, due to limitation by the torch head, it is only suitable for surfacing of the outer surfaces of small components. Explosive welding, with higher efficiency, is limited to the quality of the explosive cladding itself, which is difficult to control, and is mainly used in situations where the working conditions are simple, easy to repair and with low pressure requirements. The ordinary submerged arc and consumable electrode metal inert gas welding surfacing have high efficiency, in particular, the consumable electrode metal inert gas welding also has full-automatic welding functions such as full-position, special-shaped parts, small channel features, etc., but it is mainly limited by an excessively deep welding penetration depth and high dilution rate, so it is only suitable for applications with a thick surfacing layer.

Chinese patent document CN105665955B discloses a cable-type welding wire, including a central welding wire and n peripheral welding wires provided to be spirally wound around the central welding wire. Each peripheral welding wire has a diameter of d, adjacent peripheral welding wires are arranged to be tangential to each other, the peripheral welding wire has a lay length of T, which satisfies the equation of $T = K \times m \times d$, where K is the structural coefficient of the peripheral welding wire, m is the lay length coefficient, and d is the diameter of the peripheral welding wire, $1 \leq K \leq 1.5$, $20 \leq m \leq 25$. The movement direction of charged particles of the cable-type welding wire in the prior art during welding is mainly perpendicular to the base metal, the cable-type welding wire has a large penetration depth, a high dilution rate, and is difficult to control surfacing quality, thus, it is mainly suitable for bevel butt welds and fillet welds, but not suitable for surfacing that requires shallower welding penetration, a lower dilution rate and a thinner surfacing layer.

SUMMARY

Therefore, the present application is intended to solve a technical problem of overcoming the deficiencies of great welding penetration depth and high dilution rate of a cable-type welding wire in the prior art, so as to provide a cable-type welding wire with small welding penetration depth and low dilution rate.

To solve the above problem, the cable-type welding wire provided by the present application comprises a central welding wire and n peripheral welding wires arranged so as to be spirally wound on the central welding wire, with each of the peripheral welding wires having a diameter of $d_{peripheral}$, and adjacent peripheral welding wires being arranged to be tangential to each other, wherein, the peripheral welding wires have a lay length of T, which satisfies the equation of $T = m \times (d_{peripheral} + d_{central})/2$, where m is a multiple of the lay length, $d_{peripheral}$ is a diameter of the peripheral welding wire, $d_{central}$ is a diameter of the central welding wire, and $3.2 \leq m < 20$.

An included angle between a rotation direction of the peripheral welding wire and a direction perpendicular to a length of the central welding wire or between a normal plane of the peripheral welding wire and a plane where the central welding wire is located is a helix angle α, which satisfies the equation of α=arctan(m/2π).

An included angle between a rotation direction of the peripheral welding wire and a direction perpendicular to a length of the central welding wire or between a normal plane of the peripheral welding wire and a plane where the central welding wire is located is a helix angle α, which satisfies the equation of α=−9E-08 m$^6$+2E-05 m$^5$−0.0011 m$^4$+0.0405 m$^3$−0.8968 m$^2$+11.971 m−3.3502.

$$26.99°≤α<72.56°.$$

When a thickness of a surfacing layer is required to be less than 3 mm, m≤9, α≤55.08°; when the thickness of a surfacing layer is required to be 3 mm to 6 mm, m 14, α≤65.83°; and when the thickness of a surfacing layer is required to be more than 6 mm, m<20, α<72.56°.

$$0.5 \text{ mm} ≤ d_{peripheral} ≤ 2 \text{ mm}.$$

The cable-type welding wire comprises at least 3 peripheral welding wires.

The peripheral welding wire is a solid welding wire and/or a seamless flux-cored welding wire and/or a seamed flux-cored welding wire.

The central welding wire is a solid welding wire or a flux-cored welding wire or a cable-type welding wire.

The technical solutions of the present application have the following advantages:

The cable-type welding wire provided by the present application can obtain smaller penetration depth when the welding parameters remain constant due to a small multiple of the lay length of the cable-type welding wire, and can further reduce welding arcing current, which in turn boosts a reduction in the welding penetration depth, making a significant contribution to control the dilution rate of the surfacing layer. With a smaller penetration depth and a lower dilution rate during welding, the cable-type welding wire can be used in the field of surfacing requiring shallower penetration, a lower dilution rate and a thinner surfacing layer.

In the cable-type welding wire provided by the present application, 26.99°≤α<72.56°, under the same conditions, the smaller the helix angle α of the peripheral welding wire, the smaller the penetration depth and the larger the fusion width, which makes it easier to increase the welding rate, that is, to further reduce the welding penetration depth. Therefore, the cable-type welding wire is particularly adapted to be applied in a surfacing method with strict requirements on the dilution rate of a base material by corrosion and wear.

In the cable-type welding wire provided by the present application, experimental research shows that when the thickness of a surfacing layer is required to be more than 6 mm, m<20, α<72.56°, by controlling a smaller welding current and a higher welding speed, the penetration depth during the surfacing welding of the cable-type welding wire consumable electrode can be controlled to be 3 mm or even lower; when thickness of a surfacing layer requires within 3 mm to 6 mm, m≤14, α≤65.83°, the penetration depth during the surfacing welding of the cable-type welding wire consumable electrode can be controlled to 2 mm or even lower by controlling a smaller welding current and a higher welding speed; when thickness of a surfacing layer requires within 3 mm to 6 mm, m≤14, α≤65.83°, the penetration depth during the surfacing welding of the cable-type welding wire consumable electrode can be controlled to 1 mm or even lower when the thickness of a surfacing layer is less than 3 mm, m≤9, and α≤55.08°, by controlling a smaller welding current and a higher welding speed. Hence the cable-type welding wire provided by the present application lays down an important theoretical and experimental research foundation for ordinary metal inert gas welding and submerged-arc welding as well as applications in the field of surfacing welding. Metal inert gas welding and submerged-arc welding surfacing of the cable-type welding wire can significantly reduce welding production costs and improve economic benefits. Agitation in a molten pool can accelerate the discharge of gases and slag inclusions, which plays an important role in ensuring the quality of surfacing metal.

BRIEF DESCRIPTION OF THE DRAWINGS

In order to make a clearer description of technical solutions in specific implementations of the present application or prior art, drawings involved in description for the specific implementations or the prior art will be briefly introduced, and apparently, the drawings described below illustrate some implementations of the present application, for one with ordinary skill in the art, other drawings can also be obtained in accordance with these drawings without delivering creative efforts.

DETAILED DESCRIPTION

Figure 1:
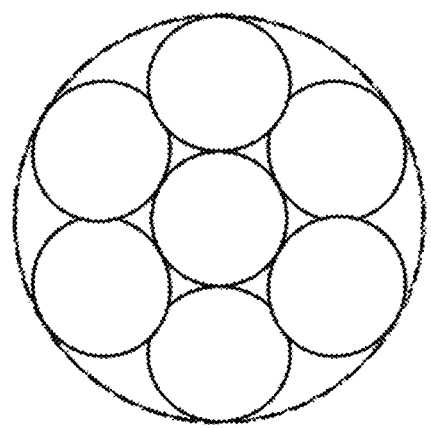
FIG. 1 is a schematic structural view of the cross-section of the peripheral welding wires having a central line with a helix angle α of 72.56°, when a minimum multiple of the lay length m of an equal-diameter 1+6 cable-type welding wire is equal to 20.

Technical solutions of the present application will be described clearly and completely as follows in conjunction with the drawings, apparently, the described embodiments are just part rather than all embodiments of the present application. Based on the embodiments in the present application, all other embodiments obtained by one with ordinary skill in the art without delivering creative efforts shall fall into the protection scope of the present application.

In the description of the present application, it should be noted that, orientation or position relationships indicated by terms such as "centre", "upper", "lower", "left", "right", "vertical", "horizontal", "inner", "outer", etc. are orientation or position relationships indicated on the basis of the accompanying drawings, are only intended to facilitate description or simplified description of the present application, rather than indicating or implying that the involved apparatus or element shall have specific orientations, or be configured and operated specifically, and therefore shall not be construed as limit on the present application. In addition, terms such as "first", "second", "third", which are merely intended to deliver description, can not be construed as indicating or implying relative importance.

In the description of the present application, it should be noted that, unless specified and defined otherwise, the terms of "installation", "interconnection" and "connection" shall be understood in a broad sense, for example, a fixed connection, a removable connection, an integral connection, a mechanical connection, an electrical connection, a direct connection, an indirect connection via intermediate medium, or further, internal communication between two elements, a wireless connection, or a wired connection. Case-by-case interpretation can be made to the above terms in the present application by one with ordinary skill in the art.

Moreover, technical features involved in different implementations described in the present application below may be combined with each other as long as no conflicts occur therebetween.

Through a large number of tests, it is found in the present application that when the parameters such as welding current are constant, the smaller the lay length multiple m of the peripheral welding wire, the smaller the helix angle α; and when other parameters remain unchanged, the smaller the welding penetration depth, the lower the dilution rate. In addition, when the lay length multiple m is small, if 6 peripheral welding wires with an equal diameter and 1 central welding wire are used, it is difficult to produce extrusion plastic deformation between the welding wires with relatively high hardness during a twisting process, which is adverse to cable formation. In this case, a cable can be formed by twisting 5 peripheral welding wires and 1 central welding wire or 4 peripheral welding wires and 1 central welding wire, or by reducing the diameter of the peripheral welding wires, thereby ensuring a smaller helix angle α, making the fusion width of surfacing welds larger and the penetration depth smaller, and because the total number of welding wire is reduced, arcing current of the welding wires is smaller, which makes it easier to further reduce the penetration depth. Therefore, it is urgent and of great importance to further reduce the helix angle α while ensuring a compact structure and stable welding wire feed, so as to reduce the welding penetration depth to guarantee quality in the design of a thin surfacing layer, enabling efficient consumable electrode gas protection surfacing and the application of submerged arc surfacing. Based on this, after a lot of theoretical and experimental research, the present application provides a cable-type welding wire, comprising a central welding wire and n peripheral welding wires arranged, so as to be spirally wound on the central welding wire, with each of the peripheral welding wires having a diameter of $d_{peripheral}$, and adjacent peripheral welding wires being arranged to be tangential to each other, wherein, the peripheral welding wires have a lay length of T, which satisfies the equation of T=m×($d_{peripheral}$+$d_{central}$)/2, where m is a multiple of the lay length, $d_{peripheral}$ is a diameter of the peripheral welding wire, $d_{central}$ is a diameter of the central welding wire, and 3.2≤m<20.

The cable-type welding wire has a small multiple of the lay length, and can obtain a smaller penetration depth when the welding parameters remain constant and further reduce the welding arcing current, which in turn boosts a reduction in the welding penetration depth, making a significant contribution to control the dilution rate of the surfacing layer. With a smaller penetration depth and a lower dilution rate during welding, the cable-type welding wire can be used in the field of surfacing requiring shallower penetration, a lower dilution rate and a thinner surfacing layer.

In a preferred implementation, an included angle between a rotation direction of the peripheral welding wire and a direction perpendicular to a length of the central welding wire or between a normal plane of the peripheral welding wire and a plane where the central welding wire is located is a helix angle α, which satisfies the equation of α=arctan (m/2π) or α=−9E-08 $m^6$+2E-05 $m^5$−0.0011 $m^4$+0.0405 $m^3$−0.8968 $m^2$+11.971 m−3.3502.

The above implementation is obtained by the following calculation method: For the central line of each peripheral welding wire of the cable-type welding wire, it is essentially a cylindrical spiral line spirally wound around the central line of the central welding wire, the helix angle is constant and the calculation formula thereof is α=arctan(H/πD), where H is a helical pitch, D is the diameter of the cylindrical spiral line, in this implementation, the peripheral welding wire has a lay length of T, which satisfies the equation of T=m×($d_*$ +$d_*$ )/2 and equivalent to the helical pitch, and D=$d_{peripheral}$+$d_{central}$, hence α=arctan(m/2π), and α=−9E-08 $m^6$+2E-05 $m^5$−0.0011 $m^4$+0.0405 $m^3$−0.8968 $m^2$+11.971 m−3.3502 is a polynomial function relationship of the above formula. In a preferred implementation, 26.99°≤α<72.56°, in the case that other conditions remain unchanged, the smaller the helix angle C (of the peripheral welding wire, the smaller the penetration depth, and the larger the fusion width, making it easier to increase the welding speed, that is, to further reduce the welding penetration depth, and it is particularly suitable for surfacing methods with strict requirements on the dilution rate of a base material by corrosion and wear.

Experimental research shows that when the thickness of a surfacing layer is required to be more than 6 mm, m<20, α<72.56°, by controlling a smaller welding current and a higher welding speed, the penetration depth during the surfacing welding of the cable-type welding wire consumable electrode can be controlled to be 3 mm or even lower; when the thickness of a surfacing layer is required to be within 3 mm to 6 mm, m≤14, α≤65.83°, by controlling a smaller welding current and a higher welding speed, the penetration depth during the surfacing welding of the cable-type welding wire consumable electrode can be controlled to be 2 mm or even lower; when the thickness of a surfacing layer is required to be below 3 mm, m≤9, α≤55.08°, by controlling a smaller welding current and a higher welding speed, the penetration depth during the surfacing welding of the cable-type welding wire consumable electrode can be controlled to be 1 mm or even lower. Hence the present application lays down an important theoretical and experimental research foundation for the application of ordinary metal inert gas welding and submerged-arc welding in the field of surfacing welding. Metal inert gas welding and submerged-arc welding surfacing of the cable-type welding wire can significantly reduce welding production costs and improve economic benefits. Agitation in a molten pool of the cable-type welding wire can accelerate the discharge of gases and slag inclusions, which plays an important role in ensuring the quality of surfacing metal.

In a preferred implementation, 0.5 mm≤$d_{peripheral}$≤2 mm. The cable-type welding wire comprises at least 3 peripheral welding wires. The peripheral welding wire is a solid welding wire and/or a seamless flux-cored welding wire and/or a seamed flux-cored welding wire. The central welding wire is a solid welding wire or a flux-cored welding wire or a cable-type welding wire.

After testing and research, it is found that in working conditions, such as a corrosion environment containing H2S and those requiring an effective thickness of the surfacing layer less than 3 mm, a cable-type welding wire with α≤50° shall be adopted as underlay surfacing, a cable-type welding wire with α≤65° shall be adopted as the filling layer, and a cable-type welding wire with α≤75° shall be adopted as the surface layer. For flux-cored welding wire with a helix angle α≤60°, due to the difficulty in production and processing in case of a flux-cored peripheral welding wire, the peripheral welding wire should be a solid thin welding wire, and a flux-cored welding wire structure, i.e., the central welding wire, is used as a base transition layer, the filling layer and above use a full flux-cored cable-type welding wire with α≥60°.

Embodiment 1

Figure 2:
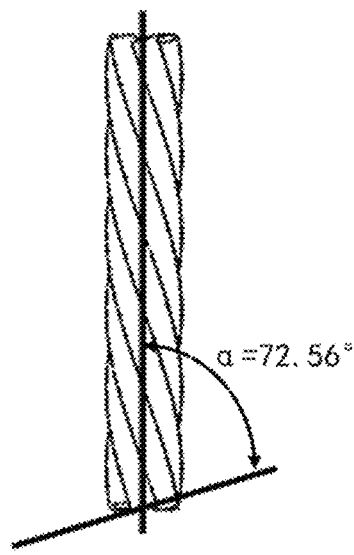
FIG. 2 is a structural diagram illustrating the front view with a value of the helix angle α for the peripheral welding wire having a central line with a helix angle α of 72.56°, when a minimum multiple of the lay length m of an equal-diameter 1+6 cable-type welding wire is equal to 20.

The structure of the cable-type welding wire for surfacing provided by this embodiment is 1+6, as shown in FIG. 1 and FIG. 2, that is, the number of the peripheral welding wires is 6, the number of the central welding wires is 1, and each welding wire has a diameter of 1.33 mm and is a solid welding wire, the lay length multiple m is 18, the helix angle α is 70.76°.

Embodiment 2

Figure 3:
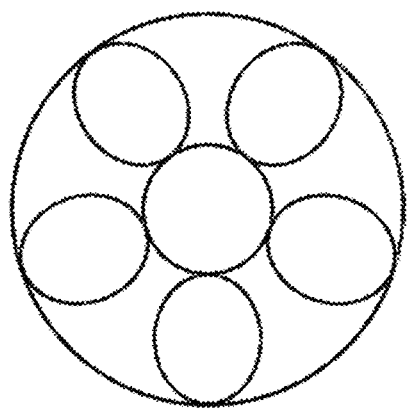
FIG. 3 is a schematic structural view of the cross-section of the peripheral welding wires having a central line with a helix angle α of 55.08°, when a multiple of the lay length m of an equal-diameter 1+5 cable-type welding wire is equal to 9.
Figure 4:
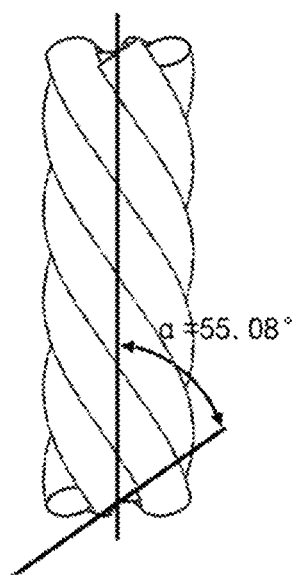
FIG. 4 is a structural diagram illustrating the front view with a value of the helix angle α for the peripheral welding wire having a central line with a helix angle α of 55.08°, when a multiple of the lay length m of an equal-diameter 1+5 cable-type welding wire is equal to 9.

The structure of the cable-type welding wire for surfacing provided by this embodiment is 1+5, as shown in FIG. 3 and FIG. 4, that is, the number of the peripheral welding wires is 5, the number of the central welding wires is 1, and each welding wire has a diameter of 1.0 mm and is a solid welding wire, the lay length multiple m is 9, the helix angle α is 55.08°.

Embodiment 3

Figure 5:
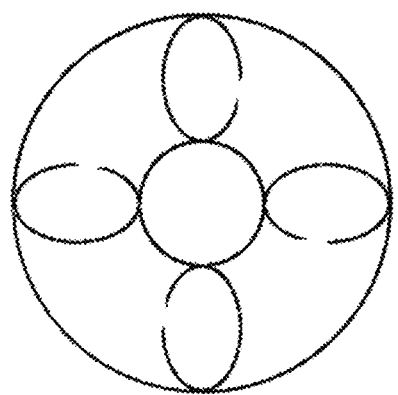
FIG. 5 is a schematic structural view of the cross-section of the peripheral welding wires having a central line with a helix angle α of 38.51°, when a multiple of the lay length m of an equal-diameter 1+4 cable-type welding wire is equal to 5.
Figure 6:
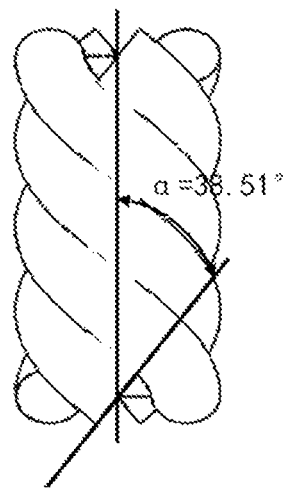
FIG. 6 is a structural diagram illustrating the front view with a value of the helix angle α for the peripheral welding wire having a central line with a helix angle α of 38.51, when a multiple of the lay length m of an equal-diameter 1+4 cable-type welding wire is equal to 5.

The structure of the cable-type welding wire for surfacing provided by this embodiment is 1+4, as shown in FIG. 5 and FIG. 6, that is, the number of the peripheral welding wires is 4, the number of the central welding wires is 1, and each welding wire has a diameter of 2 mm and is a solid welding wire, the lay length multiple m is 5, the helix angle α is 38.51°.

Embodiment 4

Figure 7:
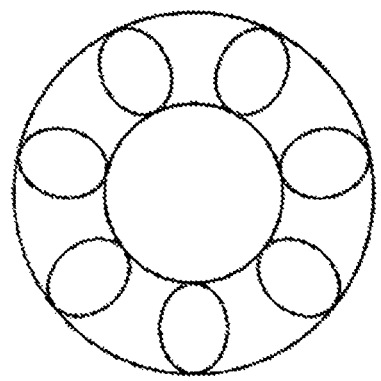
FIG. 7 is a schematic structural view of the cross-section of the peripheral welding wires having a central line with a helix angle α of 49.41°, when a 1+7 cable-type welding wire has $d_{peripheral}$=1 mm, $d_{central}$=2 mm, n=7, and a multiple of the lay length m 7.33.
Figure 8:
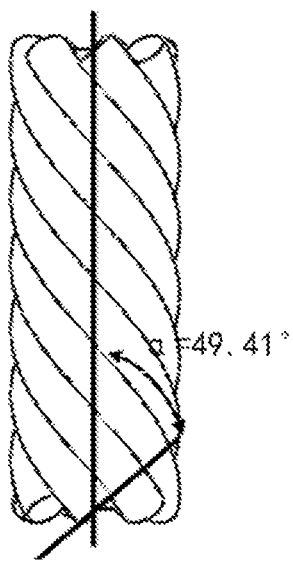
FIG. 8 is a schematic structural view of the cross-section of the peripheral welding wires having a central line with a helix angle α of 49.41°, when a 1+7 cable-type welding wire has $d_{peripheral}$=1 mm, $d_{central}$=2 mm, n=7, and a multiple of the lay length m 7.33.

The structure of the cable-type welding wire for surfacing provided by this embodiment is 1+7, as shown in FIG. 7 and FIG. 8, that is, the number of the peripheral welding wires is 7, the number of the central welding wires is 1, and each welding wire has a diameter of 0.5 mm and is a solid welding wire, the lay length multiple m is 7.33, the helix angle α is 49.41°.

Embodiment 5

Figure 9:
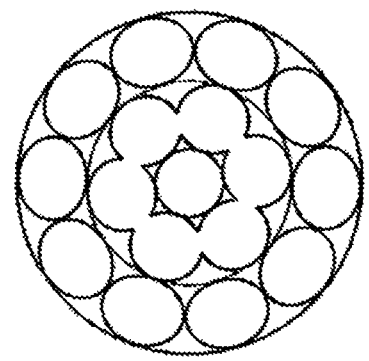
FIG. 9 is a schematic structural view of the cross-section of the peripheral welding wires having a central line with a helix angle α of 55.08°, when a (1+6)+10 cable-type welding wire has $d_{peripheral}$=1 mm, $d_{central}$=3 mm (1+6 cable-type welding wire), n=10, and a multiple of the lay length m 9.
Figure 10:
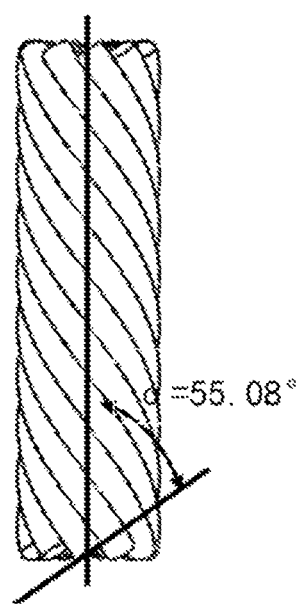
FIG. 10 is a schematic structural view of the cross-section of the peripheral welding wires having a central line with a helix angle α of 55.08°, when a (1+6)+10 cable-type welding wire has $d_{peripheral}$=1 mm, $d_{central}$=3 mm (1+6 cable-type welding wire), n=10, and a multiple of the lay length m 9.

The structure of the cable-type welding wire for surfacing provided by this embodiment is (1+6)+10, as shown in FIG. 9 and FIG. 10, that is, the number of the peripheral welding wires is 10, the number of the central welding wires is 1, the central welding wire has a diameter of 3 mm, the peripheral welding wire has a diameter of 1 mm, all of the welding wires are solid welding wires, the lay length multiple m of the peripheral welding wire is 9, and the helix angle α is 55.08°.

Embodiment 6

Figure 11:
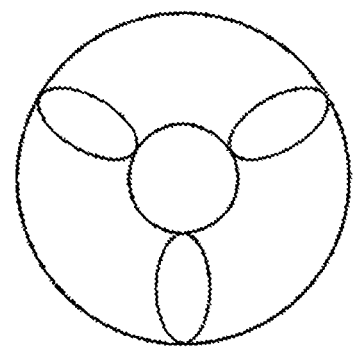
FIG. 11 is a schematic structural view of the cross-section of the peripheral welding wires having a central line with a helix angle α of 26.99°, when a 1+3 cable-type welding wire has $d_{peripheral}$=0.8 mm, $d_{central}$=0.8 mm, n=3, and a multiple of the lay length m 3.2.
Figure 12:
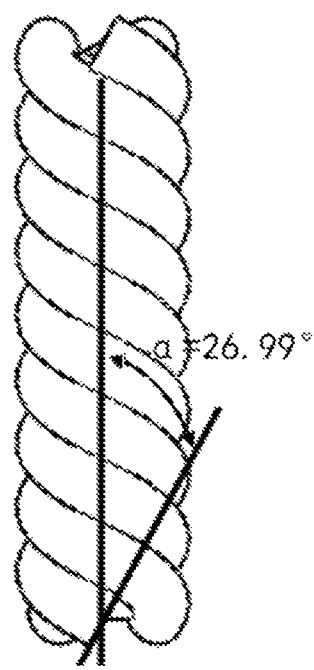
FIG. 12 is a schematic structural view of the cross-section of the peripheral welding wires having a central line with a helix angle α of 26.99°, when a 1+3 cable-type welding wire has $d_{peripheral}$=0.8 mm, $d_{central}$=0.8 mm, n=3, and a multiple of the lay length m 3.2.

The structure of the cable-type welding wire for surfacing provided by this embodiment is 1+3, as shown in FIG. 11 and FIG. 12, that is, the number of the peripheral welding wires is 3, the number of the central welding wires is 1, and the peripheral and the central welding wire each have a diameter of 0.8 mm and are solid welding wires, the lay length multiple m of the peripheral welding wire is 3.2, and the helix angle α is 26.99°.

Comparative Example 1

The welding wire with a structure of a single wire having a diameter of φ4 mm is provided in this comparative example for the conduction of submerged-arc welding.

Comparative Example 2

The welding wire with a structure of a single wire having a diameter of φ1.2 mm is provided in this comparative example for the conduction of metal inert gas welding.

Comparative Example 3

The structure of the cable-type welding wire provided by this comparative example is 1+6, as shown in FIG. 1 and FIG. 2, that is, the number of the peripheral welding wires is 6, the number of the central welding wires is 1, and each welding wire has a diameter of 1.33 mm and is a solid welding wire, the lay length multiple m is 20, and the helix angle α is 72.56°, and the corresponding surfacing method is submerged-arc welding.

Comparative Example 4

The structure of the cable-type welding wire provided by this comparative example is 1+6, as shown in FIG. 1 and FIG. 2, that is, the number of the peripheral welding wires is 6, the number of the central welding wires is 1, and each welding wire has a diameter of 0.8 mm and is a solid welding wire, the lay length multiple m is 20, and the helix angle α is 72.56°, and the corresponding surfacing method is metal inert gas welding.

Comparative Example 5

The structure of the cable-type welding wire provided by this comparative example is 1+6, as shown in FIG. 1 and FIG. 2, tat is, the number of the peripheral welding wires is 6, the number of the central welding wires is 1, and each welding wire has a diameter of 2 mm and is a solid welding wire, the lay length multiple m is 20, and the helix angle α is 72.56°, and the corresponding surfacing method is submerged-arc welding.

TABLE 1

| helix angle α | diameter of peripheral welding wire $d_{peripheral}$ | diameter of central welding wire $d_{central}$ | lay length T | lay length multiple m |
|---|---|---|---|---|
| 38.51 | 0.8 | 0.8 | 4 | 5 |
| 38.51 | 2 | 2 | 10 | 5 |
| 38.51 | 1 | 2 | 7.5 | 5 |
| 55.08 | 0.8 | 0.8 | 7.2 | 9 |
| 55.08 | 2 | 2 | 18 | 9 |
| 55.08 | 1 | 2 | 13.5 | 9 |
| 67.27 | 0.8 | 0.8 | 12 | 15 |
| 67.27 | 2 | 2 | 30 | 15 |
| 67.27 | 1 | 2 | 22.5 | 15 |

Table 1 shows the correlation between the helix angle α and the lay length multiple m. It can be seen that whether the diameter d of the peripheral welding wire is equal to or different from the diameter d of the central welding wire, the same helix angle α can be obtained, and if the lay length multiple m is changed, then the helix angle α will be changed, that is, the helix angle α for a space curve should be independent of the welding wire diameter, and should only be related to the lay length multiple m of the peripheral welding wire.

TABLE 2

| | Welding method | Current I A | Voltage U V | Rate V cm/min | Lay length multiple m | Helix angle α° | Penetration depth mm |
|---|---|---|---|---|---|---|---|
| Comparative example 1 | submerged arc surfacing of φ4 single wire | 500 | 30 | 80 | / | ∞ | 3.45 |
| | | 550 | 30 | 80 | / | ∞ | 3.91 |
| | | 600 | 30 | 80 | / | ∞ | 5.70 |
| Comparative example 3 | submerged arc surfacing (1 + 6) type) of φ4 cable wires | 500 | 30 | 80 | 20 | 72.56 | 2.67 |
| | | 550 | 30 | 80 | 20 | 72.56 | 3.01 |
| | | 600 | 30 | 80 | 20 | 72.56 | 3.50 |
| Comparative example 5 | submerged arc surfacing (1 + 6) type) of φ6 cable wires | 500 | 32 | 80 | 20 | 72.56 | 3.00 |
| | | 700 | 32 | 80 | 20 | 72.56 | 3.13 |
| | | 900 | 32 | 80 | 20 | 72.56 | 3.50 |
| Embodiment 1 | submerged arc surfacing (1 + 6) type) of φ4 cable wires | 500 | 30 | 80 | 18 | 70.76 | 1.98 |
| | | 550 | 30 | 80 | 18 | 70.76 | 2.14 |
| | | 600 | 30 | 80 | 18 | 70.76 | 2.25 |
| Embodiment 3 | submerged arc surfacing (1 + 4) type) of φ6 cable wires | 400 | 32 | 80 | 5 | 38.51 | 0.68 |
| | | 450 | 32 | 80 | 5 | 38.51 | 0.96 |
| | | 500 | 32 | 80 | 5 | 38.51 | 1.12 |
| Embodiment 5 | submerged arc surfacing ((1 + 6) + 10 type) of φ5 cable wires | 500 | 32 | 80 | 9 | 55.08 | 0.89 |
| | | 600 | 32 | 80 | 9 | 55.08 | 1.23 |
| | | 700 | 32 | 80 | 9 | 55.08 | 1.48 |

The cable-type welding wires provided by Embodiment 1, 3, 5 and Comparative Examples 1, 3, 5 are subjected to surfacing penetration test, in which Aotai MZE-1000 is selected as the welding machine, using DC reverse connection, Q345E having a thickness of 15.6 mm is used as the base material; and SJ101 is used as the flux. See Table 2 for details of the welding parameters and penetration depth.

It can be seen from Table 2 that, compared with a single welding wire, the penetration depth of a cable-type welding wire is smaller under the same conditions of submerged-arc welding, especially the smaller the lay length multiple m of the cable-type welding wire, the smaller the penetration depth. And when the lay length multiple is small, the reduction in the number of peripheral welding wires is conducive to the reduction of the welding current, which is more conducive to the reduction of the surfacing penetration depth in addition with a smaller helix angle α. The designs for the cable-type welding wire used for surfacing provided in embodiment 1, 3 and 5 are only part of the present application. Other designs tat are not reflected in the embodiments but are similar to or approximate to the present application are deemed to be within the patent protection scope of the present application.

The cable-type welding wires provided by embodiments 2, 4, 6 and comparative examples 2, 4 are subjected to surfacing penetration tests, in which Hanshen HC650D is selected as the welding machine, using DC reverse connection, Q345E having a thickness of 15.6 mm is used as the base material; and 82% Ar+18% $CO_2$ is used as the protective gas. See Table 3 for details of the welding parameters and penetration depth.

TABLE 3

|  | Welding method | Current I (A) | Voltage U (V) | Rate V (cm/min) | Lay length multiple m | Helix angle α° | Penetration depth (mm) |
|---|---|---|---|---|---|---|---|
| Comparative example 2 | Φ1.2 single wire metal inert gas welding | 200<br>250<br>300 | 26<br>26<br>30 | 40<br>40<br>40 | ∞<br>∞<br>∞ | 90<br>90<br>90 | 3.50<br>4.50<br>5.51 |
| Comparative example 4 | Φ2.4 cable wire metal inert gas welding (1 + 6 type) | 400<br>450<br>500 | 30<br>32<br>34 | 40<br>40<br>40 | 20<br>20<br>20 | 72.56<br>72.56<br>72.56 | 7.11<br>8.02<br>9.50 |
| Embodiment 2 | Φ3 cable wire metal inert gas welding (1 + 5 type) | 300<br>350<br>400 | 30<br>32<br>34 | 40<br>40<br>40 | 9<br>9<br>9 | 55.08<br>55.08<br>55.08 | 1.03<br>2.28<br>3.87 |
| Embodiment 4 | Φ3 cable wire metal inert gas welding (1 + 7 type) | 300<br>350<br>400 | 30<br>32<br>34 | 40<br>40<br>40 | 7.33<br>7.33<br>7.33 | 49.40<br>49.40<br>49.40 | 0.82<br>1.85<br>3.83 |
| Embodiment 6 | Φ2.4 cable wire metal inert gas welding (1 + 3 type) | 250<br>300<br>350 | 30<br>30<br>32 | 40<br>40<br>40 | 3.2<br>3.2<br>3.2 | 26.99<br>26.99<br>26.99 | 0.42<br>0.53<br>0.69 |

It can be seen from Table 3 that, compared with a single welding wire, the penetration depth of a cable-type welding wire is smaller under the same conditions of metal inert gas welding, especially the smaller the lay length multiple m of the cable-type welding wire, the smaller the penetration depth. And when the lay length multiple is small, the reduction in the number of peripheral welding wires is conducive to the reduction of the welding current, which is more conducive to the reduction of the surfacing penetration depth in addition with a smaller helix angle α. The designs for the cable-type welding wire used for surfacing provided in embodiment 2, 4 and 6 are only part of the present application. Other designs that are not reflected in the embodiments but are similar to or approximate to the present application are deemed to be within the patent protection scope of the present application.

Obviously, the above embodiments are merely intended to clearly illustrate rather than limit the numerated implementations. For one with ordinary skill in the art, other different forms of modifications or changes may further be made on the basis of the aforementioned descriptions. It is unnecessary and impossible to exhaust all implementations. And modifications or changes derived herefrom obviously fall into the protection scope of the present application.

The invention claimed is:

1. A cable welding wire, comprising: a central welding wire and n peripheral welding wires spirally winding around the central welding wire, with each of the peripheral welding wires having a diameter of $d_{peripheral}$, and adjacent peripheral welding wires being arranged to be tangential to each other, wherein, the peripheral welding wire has a lay length T, which satisfies the equation of $T=m \times (d_{peripheral}+d_{central})/2$, where m is a multiple of the lay length, $d_{peripheral}$ is a diameter of the peripheral welding wire, $d_{central}$ is a diameter of the central welding wire, and 3.2≤m<20, an included angle between a rotation direction of the peripheral welding wire and a direction perpendicular to a length of the central welding wire or between a normal plane of the peripheral welding wire and a plane where the central welding wire is located is a helix angle α, wherein, 26.99°≤α<72.56°, wherein, when a thickness of a surfacing layer is required to be less than 3 mm, m≤9, α≤55.08°, so that the penetration depth during surfacing welding of the cable welding wire can be controlled to be no more than 1 mm;

when the thickness of a surfacing layer is required to be 3 mm to 6 mm, m≤14, α≤65.83°, so that the penetration depth during surfacing welding of the cable welding wire can be controlled to be no more than 2 mm; and when the thickness of a surfacing layer is required to be more than 6 mm, m<20, α<72.56°, so that the penetration depth during surfacing welding of the cable welding wire can be controlled to be no more than 3 mm.

2. The cable welding wire of claim 1, wherein the helix angle α satisfies the equation of α=arctan(m/2π).

3. The cable welding wire of claim 1 the helix angle α satisfies the equation of α=−9E-08 $m^6$+2E-05 $m^5$−0.0011 $m^4$+0.0405 $m^3$−0.8968 $m^2$+11.971 m−3.3502.

4. The cable welding wire of claim 1, wherein, 0.5 mm≤$d_{peripheral}$≤2 mm.

5. The cable welding wire of claim 1, comprising at least 3 peripheral welding wires.

6. The cable welding wire of claim 1, wherein the peripheral welding wire is a solid welding wire or a seamless flux-cored welding wire or a seamed flux-cored welding wire.

7. The cable welding wire of claim 6, wherein, the central welding wire is a solid welding wire or a flux-cored welding wire or a cable welding wire.

8. The cable welding wire of claim 2, comprising at least 3 peripheral welding wires.

9. The cable welding wire of claim 3, comprising at least 3 peripheral welding wires.

10. The cable welding wire of claim 2, wherein, the peripheral welding wire is a solid welding wire and/or a seamless flux-cored welding wire and/or a seamed flux-cored welding wire.

11. The cable welding wire of claim 3, wherein, the peripheral welding wire is a solid welding wire and/or a seamless flux-cored welding wire and/or a seamed flux-cored welding wire.

* * * * *